US008795481B2

(12) United States Patent
Zadeh et al.

(10) Patent No.: US 8,795,481 B2
(45) Date of Patent: Aug. 5, 2014

(54) OPTIMIZATION OF POWER SYSTEM INCLUDING ELECTROLYZER

(75) Inventors: Mohammad Reza Dadash Zadeh, London (CA); Amirhossein Hajimiragha, Richmond Hill (CA); Michael Joseph Krok, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 409 days.

(21) Appl. No.: 13/342,578

(22) Filed: Jan. 3, 2012

(65) Prior Publication Data

US 2013/0168236 A1  Jul. 4, 2013

(51) Int. Cl.
*C25B 1/04* (2006.01)
*C25B 15/02* (2006.01)

(52) U.S. Cl.
USPC ............... 204/229.2; 204/228.1; 205/628; 205/637

(58) Field of Classification Search
CPC ................................. C25B 1/04; C25B 15/02
USPC .............. 204/228.1, 229.2; 205/628–639
See application file for complete search history.

(56) References Cited

U.S. PATENT DOCUMENTS

| 2001/0039481 | A1* | 11/2001 | Tremblay et al. | 702/35 |
| 2009/0062969 | A1 | 3/2009 | Chandra et al. | |
| 2010/0114799 | A1 | 5/2010 | Black et al. | |
| 2010/0274407 | A1 | 10/2010 | Creed | |
| 2011/0155583 | A1* | 6/2011 | Li | 205/637 |
| 2011/0220516 | A1* | 9/2011 | Finfrock et al. | 205/628 |

FOREIGN PATENT DOCUMENTS

WO  03056481 A2  7/2003

OTHER PUBLICATIONS

Wikipedia entry of "NP-hard", Date Unknown.
Azmy, et al., "Management of PEM Fuel Cells for Residential Applications Using Genetic Algorithms", Department of Electrical Engineering, University of Duisberg-Essen, Germany.
Mohamed, et al., "Environmental/Economic Power Dispatch of MicroGrid Using Multiobjective Genetic Algorithms", International Renewable Energy Congress, Nov. 5-7, 2010, Sousse, Tunisia.
Bagherian, et al., "A developed Energy Management System for a Microgrid in the Competitive Electricity Market", 2009 IEEE Bucharest Power Tech Conference, Jun. 28-Jul. 2, Bucharest, Romania.
Nunna et al., "Optimal Management of Microgrids", IEEE, 2010.
Niinisto, Arto, Simulation of the Management of the Micro Grid with Wind, Solar, and Gas Generators.
Mohamed, et al., System modelling and online optimal management of MicroGrid using Mesh Adaptive Direct Search, Electrical Power and Energy Systems 32 (2010) 398-407.

(Continued)

*Primary Examiner* — Nicholas A Smith
(74) *Attorney, Agent, or Firm* — William Heinze; Hoffman Warnick LLC (57) ABSTRACT

A power generation system including an electrolyzer may be optimized taking non-linear operational constraints into account with lower processing requirements than current solutions in real time. A pre-processing module assesses non-linear operational constraints in a low-overhead manner and passes results to an optimization module. The optimization module determines an operating power value constrained in accordance with results from the pre-processing module. A post-processing module uses results from the pre-processing and optimization modules to assemble instructions to control the electrolyzer. As a result, optimization may be performed in real time.

20 Claims, 4 Drawing Sheets

(56) References Cited

OTHER PUBLICATIONS

Logenthiran, et al., "Short Term Generation Scheduling of a Microgrid", IEEE 2009.

Alkhalil, et al. "Fuel consumption optimization of a multimachine microgrid by secant method combined with IPPD table", International Conference on Renewable Energies and Power Quality, Valencia, Spain, Apr. 15-17, 2009.

Hernandez-Aramburo, et al., "Fuel Consumption Minimization of a Microgrid", IEEE 2005.

Carrion, et al., "A Computationally Efficient Mixed-Integer Linear Formulation for the Thermal Unit Commitment Problem", IEEE 2006.

El-Sharkh, "Evolutionary programming-based methodology for economical output power from PEM fuel cell for micro-grid application", Journal of Power Sources 139 (2005) 165-169.

Padhy, Narayana Prasad, "Unit Commitment—A Bibliographical Survey", IEEE 2004.

Nowak, et al., "Stochastic Lagrangian Relaxation Applied to Power Scheduling in a Hydro-Thermal System under Uncertainty", Annals of Operations Research, 100, 251-272, 2000.

Arroyo, et al., "Optimal Response of a Thermal Unit to an Electricity Spot Market", IEEE Transactions on Power Systems, vol. 15, No. 3, Aug. 2000.

Sheble, et al., "Unit Commitment Literature Synopsis", IEEE 1993.

Lauer, et al., "Solution of Large-Scale Optimal Unit Commitment Problems", IEEE 1981.

Turgeon, Andre, "Optimal Scheduling of Thermal Generating Units", IEEE Transactions on Automatic Control, vol. AC-23, No. 6, Dec. 1978.

Dillon et al., "Integer Programming Approach to the Problem of Optimal Unit Commitment with Probabilistic Reserve Determination", IEEE Transactions on Power Apparatus and Systems, vol. PAS-97, No. 6, Nov./Dec. 1978.

Pang et al., "Optimal Short-Term Thermal Unit Commitment", IEEE Transactions on Power Apparatus and Systems, vol. PAS-95, No. 4, Jul./Aug. 1976.

\* cited by examiner

OPTIMIZATION OF POWER SYSTEM INCLUDING ELECTROLYZER

BACKGROUND OF THE INVENTION

The disclosure relates generally to power system control and operation, and more particularly to control and operation of a power system including an electrolyzer that produces hydrogen gas via electrolysis.

In power systems, particularly in so-called "smart grid" power systems employing renewable energy sources, it is often desirable to store excess energy for use during times when power demand exceeds power generation capacity. For example, in a system employing wind, solar, and hydroelectric power generation, an excess of energy may be produced on a clear, windy day, but on a cloudy, calm day, or a calm night, power demand may exceed what these sources may produce. Various solutions have been realized, with using hydrogen gas as an energy carrier being particularly attractive due to its relatively high heating value and its storage. Hydrogen may be used by producing it using excess electricity, such as by electrolysis.

Electrolysis is one of the well-established technologies for hydrogen production. Electricity is used by an electrolyzer to generate hydrogen with oxygen and heat as byproducts. The generated hydrogen is then compressed and stored in, for example, tube trailers which can be used by a fuel cell plant to generate electricity at any time. This approach is particularly of interest in small isolated or grid-tied microgrids.

Electrolyzer start-up and shut-down of the electrolyzer, however, require some time to avoid damage due to shifts of temperature and pressure. In addition, an electrolyzer typically should produce a minimum hydrogen production to function. Therefore, in order to increase the life cycle, physical integrity and higher performance of the electrolyzer, some operational constraints such as minimum up-time, down-time and charging power are defined.

In power generation optimization problems generally (e.g., optimal dispatch within a microgrid where an electrolyzer is included), the aforementioned operational constraints should be considered. If power generation optimization is formulated in the form of mixed integer nonlinear programming (MINLP) or mixed integer linear programming (MILP) problems, operational constraints that are typically complex may be considered, but require substantial computing resources and time. In fact, MINLP and MILP analyses present such computational challenges that the use of these techniques is impractical for real-time and fast-response applications. Conventional linear programming (LP) is a practical technique, but is not suitable since LP cannot consider the above-mentioned, complex operational constraints.

BRIEF DESCRIPTION OF THE INVENTION

Embodiments of the invention disclosed herein may take the form of a controller configured to selectively activate an electrolyzer configured to produce hydrogen gas from source material using electricity. The controller may include a pre-processing module configured to determine a prediction length by dividing a predefined prediction horizon by a predefined time interval. The pre-processing module may also be configured to produce a forced array that indicates whether the electrolyzer may be forced to operate at each time interval during the prediction length responsive to the electrolyzer being online. In addition, the pre-processing module may be configured to produce an availability array that indicates whether the electrolyzer is available for operation at each time interval during the prediction length responsive to the electrolyzer being offline. The controller may also include an optimization module having an operating power determinator configured to produce an operating power value for the electrolyzer, and an operating constraints module configured to impose at least one operating constraint on the determination of the operating power value by the operating power determinator. The operating constraints module may use at least one of the forced array or the availability array to modify the operating power value to produce an optimized operating power value for each time interval of the prediction length. The controller may further include a post-processing module configured to determine whether to send to the electrolyzer instructions including at least one of a start command, a stop command, or the optimized operating power value produced by the operating power determinator.

Another embodiment may include a computer program product for enabling optimization of a power system that includes an electrolyzer configured for selective production of hydrogen. The system may include a controller configured for communication with the electrolyzer, and may also include a storage device configured to store the computer program product. The controller may include a computing device configured to execute the computer program product, which may include instructions in the form of computer executable program code that configures the controller. When so configured, the controller may determine a prediction length by dividing a predefined prediction horizon by a predefined time interval. A forced array may be produced that indicates whether the electrolyzer may be forced to operate at each time interval during the prediction length responsive to the electrolyzer being online. Responsive to the electrolyzer being offline, an availability array may be produced that indicates whether the electrolyzer is available for operation at each time interval during the prediction length. An operating power value at which the electrolyzer may be operated may be determined responsive to operating constraints that may include at least one of the forced array or the availability array to produce an optimized operating power value at which the electrolyzer may be operated. Instructions may be sent to the electrolyzer if it is determined that instructions, including at least one of a start command, a stop command, or the optimized operating power value, should be sent to the electrolyzer.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWING

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

As indicated above, aspects of the invention provide a method of incorporating electrolyzer operational constraints, such as a minimum up-time, a minimum down-time and charging power in a real-time linear programming (LP)-based optimal dispatch process suitable for real-time control applications, particularly for use in optimizing power generation in microgrids. Pre-processing and post-processing modules may be added to conventional LP-based optimal dispatch problem analysis in embodiments. Accordingly, embodiments of the invention disclosed herein provide a new model of the electrolyzer in an optimal dispatch formulation that may incorporate the history of electrolyzer usage and to consider minimum up-time, down-time and charging power for electrolyzer.

Figure 1:
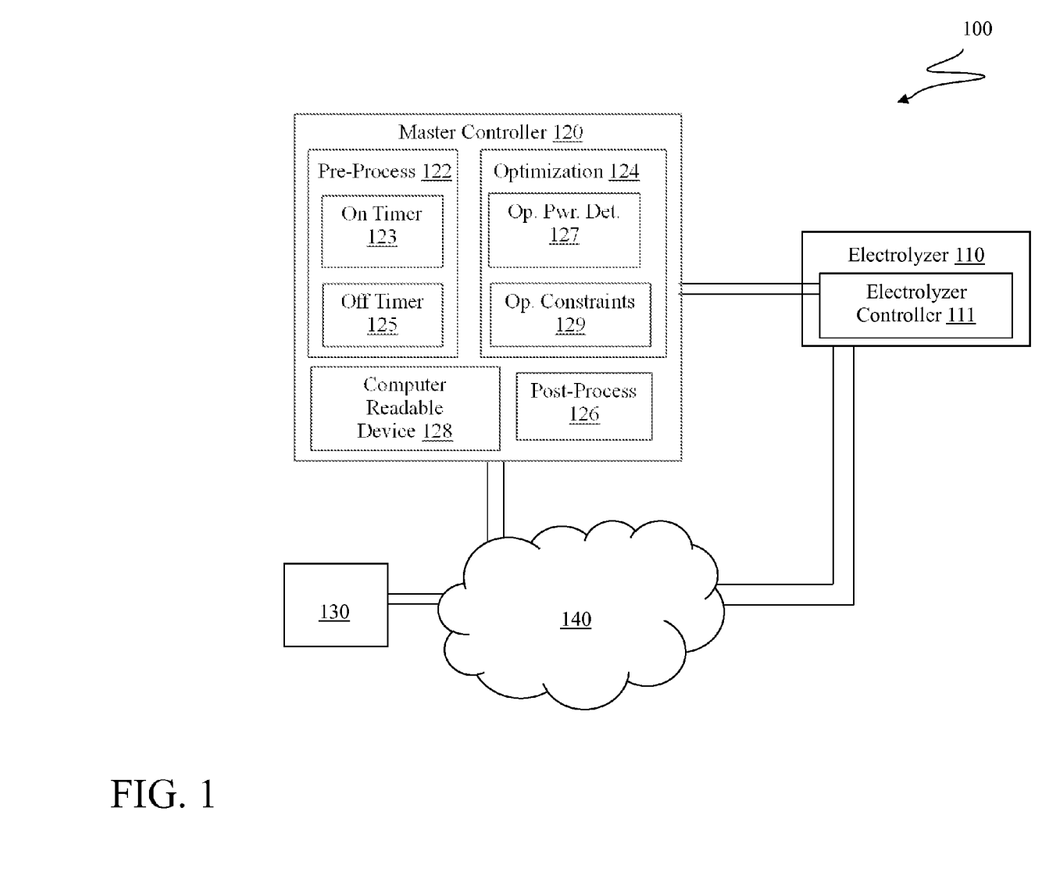
FIG. 1 shows a schematic diagram of an electrolyzer system according to embodiments of the invention disclosed herein.

With reference to FIG. 1, embodiments of the invention disclosed herein relate to optimization of operation of a power system 100 that may include an electrolyzer 110, a master controller 120, a power source 130, and a grid 140 that may include additional power sources, loads, control equipment, and/or other components as may be desired. Electrolyzer 110 may be of any suitable type, such as one that produces hydrogen from a source fluid using electricity.

Power source 130 may be connected to electrolyzer 110 under the direction of master controller 120, though in embodiments electrolyzer 110 may be connected to grid 140 as any other load. In addition, electrolyzer 110 may be powered on and/or off, such as with an electrolyzer controller 111, which may be responsive to master controller 120. For example, master controller 120 may send instructions and/or commands to electrolyzer controller 111 that may cause the electrolyzer controller 111 to power on and/or power off electrolyzer 110. In addition, in embodiments, master controller 120 may determine an operating power value at which electrolyzer 110 should operate and include the operating power value in or with the commands and/or instructions to electrolyzer controller 111. Thus, the schematic connections illustrated in FIG. 1 between electrolyzer 110, master controller 120, power source 130, and/or grid 140 may represent power pathways and/or communications pathways.

Figure 2:
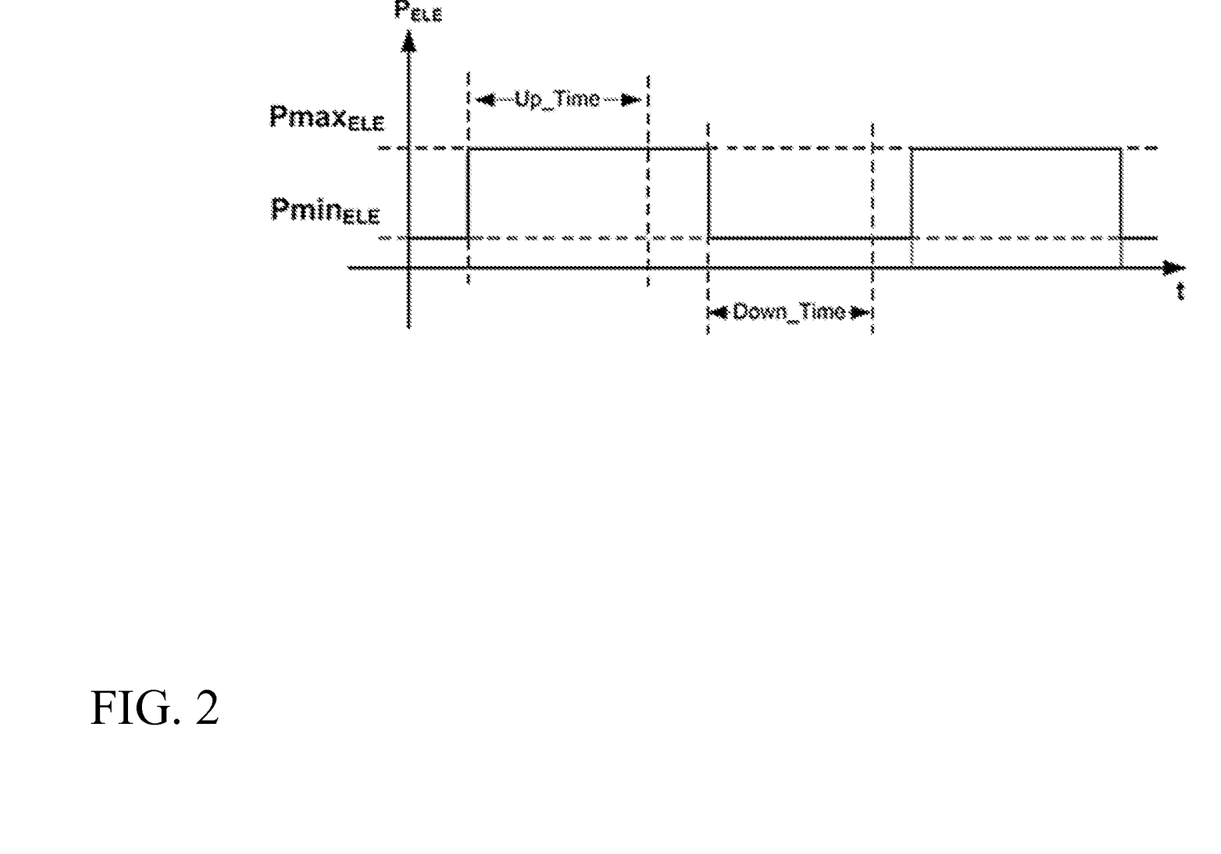
FIG. 2 shows a schematic graphical diagram of operating power versus operating time according to embodiments of the invention disclosed herein.

As seen in FIG. 2, electrolyzer 110 has various operational constraints that may apply. A minimum electric power, $P_{minELE}$, must be applied to electrolyzer 110 to produce hydrogen, and power should not exceed a maximum electric power, $P_{maxELE}$, to avoid damage to electrolyzer 110. In addition, electrolyzer 110 has a minimum operating time, Up_Time, through which electrolyzer 110 should be operated to avoid damage, and a minimum down time, Down_Time, during which electrolyzer 110 should be left off to avoid damage. The example graph of FIG. 2 shows that electrolyzer 110 was operated for a period exceeding minimum operating time, Up_Time, and was left off for a period exceeding minimum down time, Down_Time, before operating again.

In embodiments, it may be convenient to use the terms prediction horizon, time interval, and prediction length. The prediction horizon is a predefined period of time over which optimization is to be performed. The time interval is a predefined time resolution of optimization, or how often optimization is to be performed during the prediction horizon. For example, a typical time interval may be from 6 to 15 minutes, though other time intervals may be employed. The prediction length is the number of time intervals for which optimization is to be performed and may be obtained by dividing prediction horizon by time interval. Thus, for a 24-hour prediction horizon and a 12-minute time interval, a prediction length is 120 time intervals. A time step t may be used as an index in embodiments and may vary from 1 to the prediction length, where 1 is the present time step. To simplify implementation of embodiments, all parameters may be expressed in terms of time step, time interval, and prediction length.

With reference again to FIG. 1, master controller 120 may include a pre-processing module 122, an optimization module 124, and a post-processing module 126. In embodiments, pre-processing module 122 may be configured to receive predetermined values of prediction horizon and time interval to determine prediction length from a computer readable device 128, such as a computer readable storage device, an input device, or other suitable computer readable device. A first or on timer 123 of pre-processing module 122 may measure how much time, On_Time, has passed with electrolyzer 110 operating, and a second or off timer 125 may measure how much time, Off_Time, has passed with electrolyzer 110 shut down or off. In addition, pre-processing module 122 may be configured to receive a predefined value of Up_Time, as well as a predefined value of Down_Time. In embodiments, pre-processing module 122 may determine how many time intervals of operation remain, $T_{Forced}$, to meet the minimum up time, Up_Time. As seen, for example, in Equation (1), $T_{Forced}$ may be determined by pre-processing module 122 as the ceiling of a result of dividing a difference between Up_Time and On_Time by the time interval and rounding up to the nearest integer, where ceiling rounds up to the nearest integer.

$$T_{Forced} = \text{ceil}\left(\frac{\text{Up\_Time} - \text{On\_Time}}{\text{TimeInterval}}\right) \quad (1)$$

$$T_{Unavailability} = \text{ceil}\left(\frac{\text{Down\_Time} - \text{Off\_Time}}{\text{TimeInterval}}\right)$$

Similarly, pre-processing module 122 may determine how many time intervals of down time remain $T_{Unavailability}$ to meet the minimum down time, Down_Time. As also seen in Equation (1), $T_{Unavailability}$ may be determined as the ceiling of a result of dividing a difference between Down_Time and Off_Time by the time interval.

Pre-processing module 122 may generate one or both of two arrays that employ binary values indicative of when electrolyzer 110 should be forced to operate and when electrolyzer 110 may be available for operation. In embodiments, the array(s) may be generated at every time step, though other frequencies may be employed for generating the array(s). The first array, Forced, may be generated when electrolyzer 110 is online or operating, and may have a length equal to the number of intervals in the prediction length. In embodiments, Forced may have values of 1, indicating that electrolyzer 110 should be operated, from time step t of 1 to the number of intervals of operation remaining $T_{Forced}$ to meet minimum up time Up_Time, and values of zero for the remainder of Forced, as illustrated by Equation (2).

$$\text{Forced}(t=1 \text{ to } T_{Forced})=1$$

$$\text{Forced}(t=T_{Forced}+1 \text{ to PredictionLength})=0 \quad (2)$$

When electrolyzer 110 is offline or not operating, the second array, Availability, may be generated. In embodiments, Availability may have values of 0, indicating that electrolyzer is not available and/or should not be operated, from time step t of 1 to the number of intervals remaining $T_{Unavailability}$ to meet minimum down time, Down_Time, and values of 1 for the remainder of Availability.

$$\text{Availability}(t=1 \text{ to } T_{Unavailability})=0$$

$$\text{Availability}(t=T_{Unavailability}+1 \text{ to PredictionLength})=0 \quad (3)$$

Embodiments may generate both arrays, though if electrolyzer 110 is operating, Availability may not be useful, and if electrolyzer 110 is not operating, Forced may not be useful.

Optimization module 124 in embodiments may include an operating power determinator 127 and an enhancement portion or operating constraints module 129, which in embodiments imposes operating constraints of electrolyzer 110 onto operating power determinator 127. While operating constraints module 129 is schematically illustrated as a separate module, this is for convenience, and it should be noted that operating constraints module 129 or its function could be a part of operating power determinator 127. Operating power determinator 127 may be configured to determine an operating power $P_{ELE}$ for electrolyzer 110 in accordance with conventional optimization variables and/or techniques, while operating constraints module 129 may be configured to limit the operating power value when predefined constraint criteria are met. For example, operating power constraints module 129 may use the array or arrays generated by pre-processing module 122, as well as the prediction horizon, time interval, prediction length, and/or time step index to constrain optimized operating power $P_{ELE}$ for a given time interval, as predefined constraint criteria. Thus, embodiments may enhance conventionally-determination of an operating power determinator 127 by adding considerations of minimum up time Up_Time, minimum down time Down_Time, and minimum operating power $P_{minELE}$ of electrolyzer 110 with operating constraints module 129. Optimization module 124 may therefore determine an operating power $P_{ELE}$ that may be considered using embodiments, such as by adding Equation (4) as at least one operating constraint, such as of electrolyzer 110, as follows:

$$\begin{cases} P_{ELE}(t) = 0 & \text{if Availability}(t) = 0 \\ \left\{ \begin{cases} 0 \leq P_{ELE}(t) \leq P\max_{ELE} & \text{if Forced}(t) = 0 \\ P\min_{ELE} \leq P_{ELE}(t) \leq P\max_{ELE} & \text{if Forced}(t) = 1 \end{cases} \right\} & \text{if Availability}(t) = 1 \end{cases} \quad (4)$$

More specifically, as illustrated by Equation (4), for 0 values of Availability, electrolyzer operating power may be forced to be 0 by operating constraints module 129 to satisfy or enforce a minimum electrolyzer down time. For 1 values of Availability, however, operating power may be determined by operating power determinator 127, though additional constraints may be imposed by operating constraints module 129.

For 0 values of Forced, operating power may range between zero and maximum operating power of electrolyzer 110. In this case, operating power $P_{ELE}$ determined by operating power determinator 127 may automatically be less than or equal to maximum operating power.

For 1 values of Forced, operating constraints module 129 may force operating power determinator 127 to determine an operating power for electrolyzer that is at least minimum operating power of electrolyzer 110 or no more than maximum operating power of electrolyzer 110. It should be noted that the variables of Equation (4) may be one or more arrays representing operating power settings for each time step, t, for which Forced and/or Availability have values. Thus, every time pre-processing module 122 generates Forced or Availability, optimization module 124 may generate an array of operating power settings $P_{ELE}(t)$ for each time step, t, from a present time step, t=1 to the prediction length. As indicated above, this may be performed at every time step, t, in embodiments. Additionally, power values may be determined for each time step, t, of the prediction length, in embodiments, so that a one dimensional array of determined optimized operating power values may be produced for a portion of the prediction length (from t=1 to (Up_Time)) or for the entire prediction length.

Figure 3:
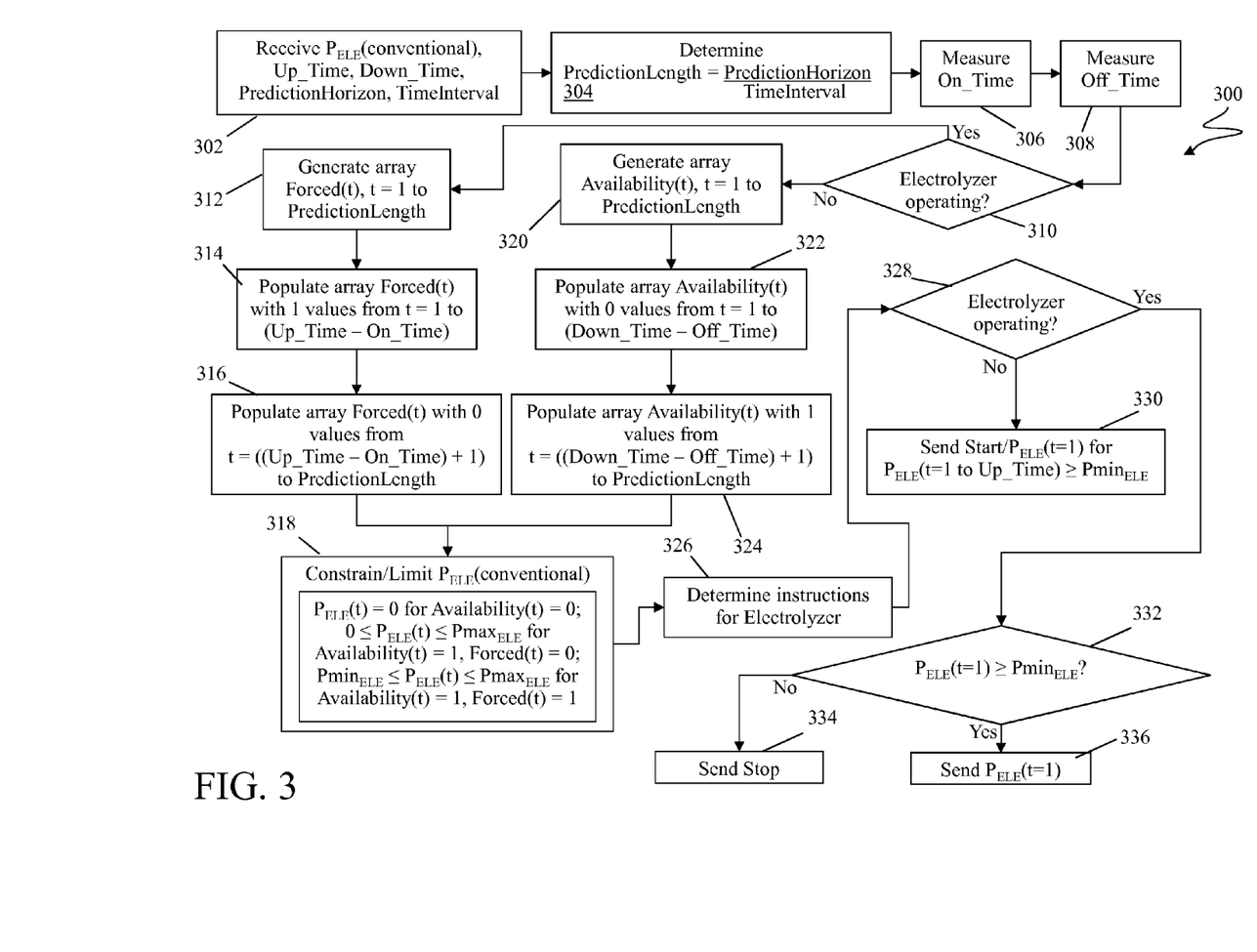
FIG. 3 shows a schematic flow diagram of an electrolyzer optimization method according to embodiments of the invention disclosed herein

Embodiments of the invention may also take the form of an electrolyzer optimization method 300, an example of which is shown in FIG. 3 as a schematic flow diagram. After receiving values of Up_Time, Down_Time, PredictionHorizon, and TimeInterval (block 302), PredictionLength may be determined (block 304), such as by dividing PredictionHorizon by TimeInterval. On_Time may be measured (block 306), such as with on timer 123, and Off_Time may be measured (block 308), such as with off timer 125, and a check may be made to determine whether electrolyzer 110 is operating (block 310). If so, Forced(t) may be generated (block 312) as a one-dimensional array with a length equal to PredictionLength by pre-processing module 122. Pre-processing module 122 may populate Forced(t) with 1 values from t=1 to (Up_Time-On_Time) (block 314), and may populate Forced(t) with 0 values for a remainder of Forced(t) to t=PredictionLength (block 316).

An operating power value as determined by conventional methods by operating power determinator 127 may be constrained or limited (block 318), such as by defining or imposing a range of operating power with operating constraints module 129. In embodiments, power values may be determined for each time step, t, of the prediction length, so that a one dimensional array of determined optimized operating power values may be produced for a portion of the prediction length (from t=1 to (Up_Time)).

If it is determined that electrolyzer 110 is not running at block 310, Availability(t) may be generated (block 320) by pre-processing module 122 as a one-dimensional array with a length equal to PredictionLength. Pre-processing module 122 may also populate Availability(t) with 0 values from t=1 to (Down_Time-Off_Time) (block 322), and may populate Availability(t) with 1 values for a remainder of Availability(t) to t=PredictionLength (block 324). An operating power value as determined by conventional methods by operating power determinator 127 may be limited or constrained (block 318), such as by defining or imposing a range of operating power with operating constraints module 129. In embodiments, constraint or limitation of selected operating power (block 318) may be performed based on predefined constraint criteria, which may include Forced(t) and/or Availability(t).

Commands for electrolyzer 110 may be assembled (326) by post-processing module 126 after determination, constraint, assessment, and/or modification of operating power responsive to a check by post-processing module 126 to see whether electrolyzer 110 is operating (block 328). If not, post-processing module 126 may include a start command in the instructions for electrolyzer 110, as well as a command for electrolyzer 110 to operate at the optimized operating power value as constrained or limited in block 318 (block 330). In embodiments in which power values are determined for each time step, t, of the prediction length, post-processing module 126 may include a command to operate at each optimized power value when all of the determined optimized operating power values are at least the minimum operating power of electrolyzer 110 for a portion of the prediction length (from t=1 to (Up_Time)) or for the entire prediction length.

If post-processing module 126 finds at block 328 that electrolyzer 110 is operating, then post-processing module 126 may determine whether the optimized operating power value is at least the minimum operating power (block 332). As above, in embodiments in which power values are determined for each time step, t, of the prediction length, post-processing module 126 may include a command to operate at each optimized power value (block 330) when all of the determined optimized operating power values are at least the minimum operating power of electrolyzer 110 for a portion of the prediction length (from t=1 to (Up_Time)).

If in block 332 it is determined that electrolyzer 110 is not operating, then post-processing module 126 may include a stop command in the instructions for electrolyzer 110 (block 334). If the optimized operating power value is at least the minimum operating power, then post-processing module 128 may include in the instructions for electrolyzer 110 a command for electrolyzer to operate at the optimized operating power value (block 336).

Figure 4:
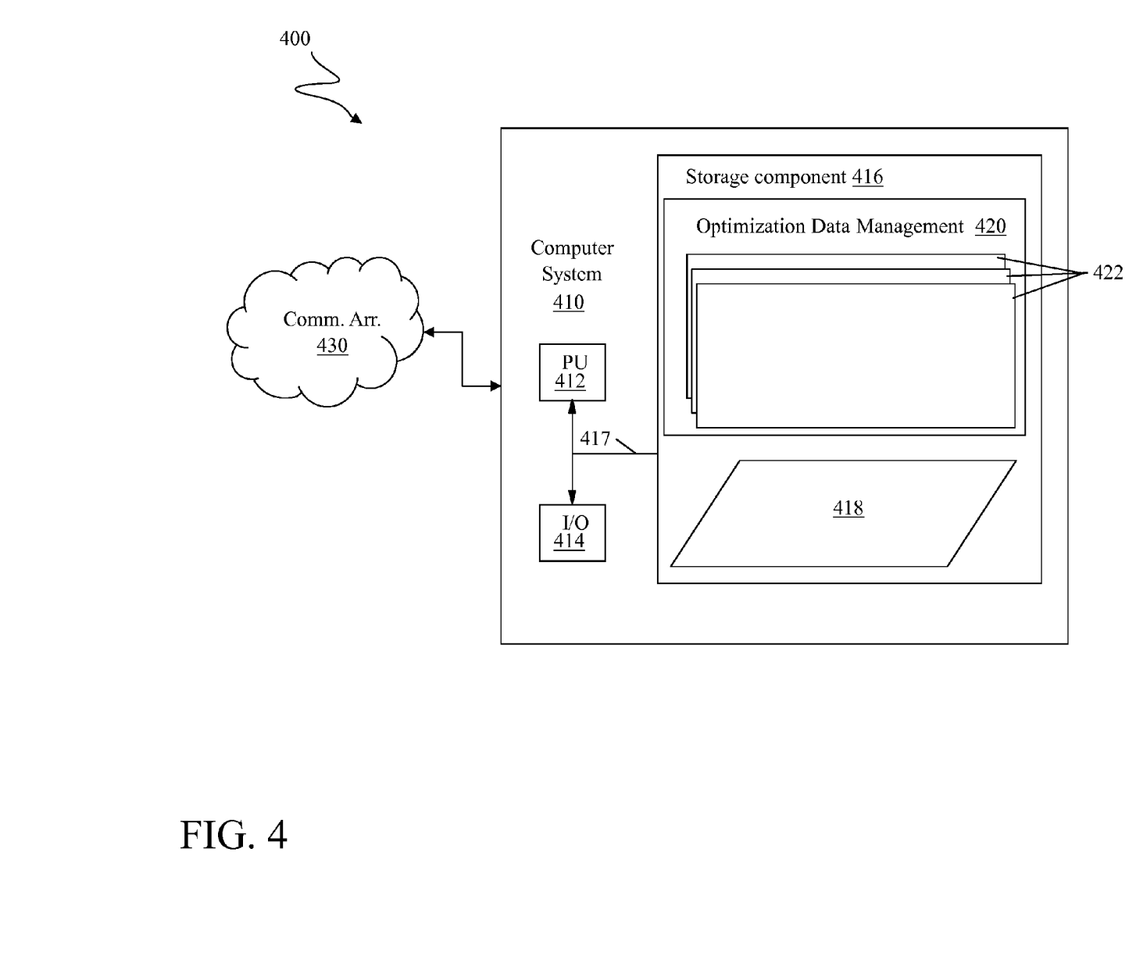
FIG. 4 shows a schematic block diagram of a computing environment for implementing electrolyzer optimization according to embodiments of the invention disclosed herein.

Turning to FIG. 4, an illustrative environment 400 for an automatic electrolyzer optimization computer program product is schematically illustrated according to an embodiment of the invention. To this extent, environment 400 includes a computer system 410, such as an electrolyzer controller 111 and/or master controller 120 or other computing device that may be part of an electrolyzer 110, which may perform a process described herein in order to execute an automatic power system optimization method considering electrolyzer operational constraints according to embodiments. In particular, computer system 410 is shown including power system optimization program 420, which makes computer system 410 operable to manage a power system including an electrolyzer by performing a process described herein, such as an embodiment of the power system optimization method discussed above.

Computer system 410 is shown including a processing component or unit (PU) 412 (e.g., one or more processors), an input/output (I/O) component 414 (e.g., one or more I/O interfaces and/or devices), a storage component 416 (e.g., a storage hierarchy), and a communications pathway 417. In general, processing component 412 executes program code, such as power system optimization program 420, which is at least partially fixed in storage component 416, which may include one or more computer readable storage medium or device. While executing program code, processing component 412 may process data, which may result in reading and/or writing transformed data from/to storage component 416 and/or I/O component 414 for further processing. Pathway 417 provides a communications link between each of the components in computer system 410. I/O component 414 may comprise one or more human I/O devices, which enable a human user to interact with computer system 410 and/or one or more communications devices to enable a system user to communicate with computer system 410 using any type of communications link. In embodiments, a communications arrangement 430, such as networking hardware/software, enables computing device 410 to communicate with other devices in and outside of a node in which it is installed. To this extent, electrolyzer optimization program 420 may manage a set of interfaces (e.g., graphical user interface(s), application program interface, and/or the like) that enable human and/or system users to interact with electrolyzer optimization program 420. Further, power system optimization program 420 may manage (e.g., store, retrieve, create, manipulate, organize, present, etc.) data, such as electrolyzer optimization data 418, using any solution.

Computer system 410 may comprise one or more general purpose computing articles of manufacture (e.g., computing devices) capable of executing program code, such as electrolyzer optimization program 420, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer program product when on at least one computer readable medium. It is understood that the term "computer readable medium" may comprise one or more of any type of tangible medium of expression, now known or later developed, from which a copy of the program code may be perceived, reproduced, or otherwise communicated by a computing device. For example, the computer readable medium may comprise: one or more portable storage articles of manufacture, including storage devices; one or more memory/storage components of a computing device; paper; and/or the like. Examples of memory/storage components and/or storage devices include magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other tangible computer readable storage medium now known and/or later developed and/or discovered on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. A technical effect of the executable instructions is to implement an automatic power system optimization method and/or system and/or computer program product that includes effects of an electrolyzer included in the power system. A determined electrolyzer operating power value may take electrolyzer operating constraints into account without the use of non-linear programming, resulting in reduced processing times that enable real time power system optimization that accommodates electrolyzer operating constraints.

The computer program code may be written in computer instructions executable by the controller, such as in the form of software encoded in any programming language. Examples of suitable computer instruction and/or programming languages include, but are not limited to, assembly language, Verilog, Verilog HDL (Verilog Hardware Description Language), Very High Speed IC Hardware Description Language (VHSIC HDL or VHDL), FORTRAN (Formula Translation), C, C++, C#, Java, ALGOL (Algorithmic Language), BASIC (Beginner All-Purpose Symbolic Instruction Code), APL (A Programming Language), ActiveX, Python, Perl, php, Tcl (Tool Command Language), HTML (HyperText Markup Language), XML (eXtensible Markup Language), and any combination or derivative of one or more of these and/or others now known and/or later developed and/or discovered. To this extent, electrolyzer optimization program 420 may be embodied as any combination of system software and/or application software.

Further, power system optimization program 420 may be implemented using a set of modules 422. In this case, a module 422 may enable computer system 410 to perform a set of tasks used by power system optimization program 420, and may be separately developed and/or implemented apart from other portions of power system optimization program 420. As used herein, the term "component" means any configuration of hardware, with or without software, which implements the functionality described in conjunction therewith using any solution, while the term "module" means program code that enables a computer system 410 to implement the actions described in conjunction therewith using any solution. When fixed in a storage component 416 of a computer system 410 that includes a processing component 412, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 410.

When computer system 410 comprises multiple computing devices, each computing device may have only a portion of power system optimization program 420 fixed thereon (e.g., one or more modules 422). However, it is understood that computer system 410 and power system optimization program 420 are only representative of various possible equivalent computer systems that may perform a process described herein. To this extent, in other embodiments, the functionality provided by computer system 410 and power system optimization program 420 may be at least partially implemented by one or more computing devices that include any combination of general and/or specific purpose hardware with or without program code. In each embodiment, the hardware and program code, if included, may be created using standard engineering and programming techniques, respectively.

Regardless, when computer system 410 includes multiple computing devices, the computing devices may communicate over any type of communications link. Further, while performing a process described herein, computer system 410 may communicate with one or more other computer systems using any type of communications link. In either case, the communications link may comprise any combination of various types of wired and/or wireless links; comprise any combination of one or more types of networks; and/or utilize any combination of various types of transmission techniques and protocols now known and/or later developed and/or discovered.

As discussed herein, power system optimization program 420 enables computer system 410 to implement an automatic electrolyzer optimization product and/or method, such as that shown schematically in FIG. 3. Computer system 410 may obtain electrolyzer optimization data 418 using any solution. For example, computer system 410 may generate and/or be used to generate electrolyzer optimization data 418, retrieve electrolyzer optimization data 418 from one or more data stores, receive electrolyzer optimization data 418 from another system or device in or outside of an electrolyzer, electrolyzer system, and/or the like.

In another embodiment, the invention provides a method of providing a copy of program code, such as power system optimization program 420 (FIG. 4), which implements some or all of a process described herein, such as that shown schematically in and described with reference to FIG. 3. In this case, a computer system may process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one tangible computer readable medium. In either case, the set of data signals may be transmitted/received using any type of communications link.

In still another embodiment, the invention provides a method of generating a system for implementing an automatic electrolyzer optimization product and/or method. In this case, a computer system, such as computer system 410 (FIG. 4), can be obtained (e.g., created, maintained, made available, etc.), and one or more components for performing a process described herein can be obtained (e.g., created, purchased, used, modified, etc.) and deployed to the computer system. To this extent, the deployment may comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to implement an automatic electrolyzer optimization product and/or method as described herein. In this case, the service provider can manage (e.g., create, maintain, support, etc.) a computer system, such as computer system 410 (FIG. 4), that performs a process described herein for one or more customers. In return, the service provider can receive payment from the customer(s) under a subscription and/or fee agreement, receive payment from the sale of advertising to one or more third parties, and/or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A controller configured to selectively activate an electrolyzer configured to produce hydrogen gas from source material using electricity, the controller comprising:
a pre-processing module configured to determine a prediction length by dividing a predefined prediction horizon by a predefined time interval, to produce a forced array that indicates whether the electrolyzer may be forced to operate at each time interval during the prediction length responsive to the electrolyzer being online, and to produce an availability array that indicates whether the electrolyzer is available for operation at each time interval during the prediction length responsive to the electrolyzer being offline;
an optimization module having:
an operating power determinator configured to produce an operating power value for the electrolyzer; and
an operating constraints module configured to impose at least one operating constraint on the determination of the operating power value by the operating power determinator using at least one of the forced array or the availability array; and
a post-processing module configured to determine whether to send to the electrolyzer instructions including at least one of a start command, a stop command, or the optimized operating power value produced by the operating power determinator.

2. The controller of claim 1, wherein the controller is a master controller of a power system that includes the electrolyzer.

3. The controller of claim 1, wherein the operating power determinator is further configured to produce an operating power array including an operating power value determined for each time interval of the prediction length.

4. The controller of claim 1, further comprising an on timer configured to measure a duration of operation of the electrolyzer.

5. The controller of claim 1, further comprising an off timer configured to measure a duration of down time of the electrolyzer.

6. The controller of claim 1, wherein the pre-processing module is further configured, responsive to the electrolyzer being online, to determine for each time interval of the prediction length, and to set a respective value of a forced array indicative of, whether the electrolyzer may be forced into operation based at least in part on a duration of operation of the electrolyzer.

7. The controller of claim 1, wherein the pre-processing module is further configured, responsive to the electrolyzer being offline, to determine for each time interval of the prediction length, and to set a respective value of an availability array indicative of, whether the electrolyzer is available for operation based at least in part on a duration of down time of the electrolyzer.

8. The controller of claim 1, wherein, responsive to the electrolyzer being offline and the optimized operating power value being at least equal to a predefined minimum operating power of the electrolyzer, the post-processing module includes in the instructions for the electrolyzer a start command for the electrolyzer and a command for the electrolyzer to operate at the optimized operating power value.

9. The controller of claim 1, wherein, responsive to the electrolyzer being online and the optimized operating power being less than a predefined minimum operating power of the electrolyzer, the post-processing module includes in the instructions a stop command for the electrolyzer.

10. The controller of claim 1, wherein, responsive to the electrolyzer being online and the optimized operating power value being at least equal to the minimum operating power required of the electrolyzer, the post-processing module includes in the instructions a command for the electrolyzer to operate at the optimized operational power value.

11. A computer program product for enabling optimization of power system that includes an electrolyzer configured for selective production of hydrogen, the system including a controller configured for communication with the electrolyzer and including a storage device configured to store the computer program product, the controller including a computing device configured to execute the computer program product, the computer program product comprising instructions in the form of computer executable program code that configures the controller to:
determine a prediction length by dividing a predefined prediction horizon by a predefined time interval;
produce a forced array that indicates whether the electrolyzer may be forced to operate at each time interval during the prediction length responsive to the electrolyzer being online;
produce an availability array that indicates whether the electrolyzer is available for operation at each time interval during the prediction length responsive to the electrolyzer being offline;
determine an operating power value at which the electrolyzer may be operated responsive to operating constraints including at least one of the forced array or the availability array, to produce an optimized operating power value at which the electrolyzer may be operated; and
determine whether to send instructions, including at least one of a start command, a stop command, or the optimized operating power value, to the electrolyzer.

12. The computer program product of claim 11, wherein the controller is a master controller of the power system and the electrolyzer includes an electrolyzer controller configured to receive instructions from the master controller including at least one of a start command, a stop command, or an operating power value.

13. The controller of claim 1, wherein the operating power determinator is further configured to produce an operating power array including an operating power value determined for each time interval of the prediction length.

14. The computer program product of claim 11, wherein the computer executable program code further configures the electrolyzer controller to measure the duration of operation of the electrolyzer with an on timer.

15. The computer program product of claim 11, wherein the computer executable program code further configures the electrolyzer controller to measure duration of down time of the electrolyzer with an off timer.

16. The computer program product of claim 11, wherein the computer executable program code further configures the electrolyzer controller, responsive to the electrolyzer being online, to determine for each time interval of the prediction length, and to set a respective value of a forced array indicative of, whether the electrolyzer may be forced into operation based at least in part on a duration of operation of the electrolyzer.

17. The computer program product of claim 11, wherein the computer executable program code further configures the electrolyzer controller, responsive to the electrolyzer being offline, to determine for each time interval of the prediction length, and to set a respective value of an availability array indicative of, whether the electrolyzer is available for operation based at least in part on a duration of down time of the electrolyzer.

18. The computer program product of claim 11, wherein the computer executable program code further configures the electrolyzer controller, responsive to the electrolyzer being offline and optimized operating power value being at least equal to a predefined minimum operating power of the electrolyzer, to include in the instructions a start command for the electrolyzer and a command for the electrolyzer to operate at the optimized operating power value.

19. The computer program product of claim 11, wherein the computer executable program code further configures the electrolyzer controller, responsive to the electrolyzer being online and the optimized operating power being less than a predefined minimum operating power of the electrolyzer, to include in the instructions a stop command for the electrolyzer.

20. The computer program product of claim 11, wherein the computer executable program code further configures the electrolyzer controller, responsive to the electrolyzer being online and the optimized operating power value being at least equal to the minimum operating power required of the electrolyzer, to include in the instructions a command for the electrolyzer to operate at the optimized operational power value.

* * * * *